June 9, 1931. P. O. STEWART Re. 18,092
HIGH TENSION IGNITION AMPLIFIER
Original Filed May 1, 1930
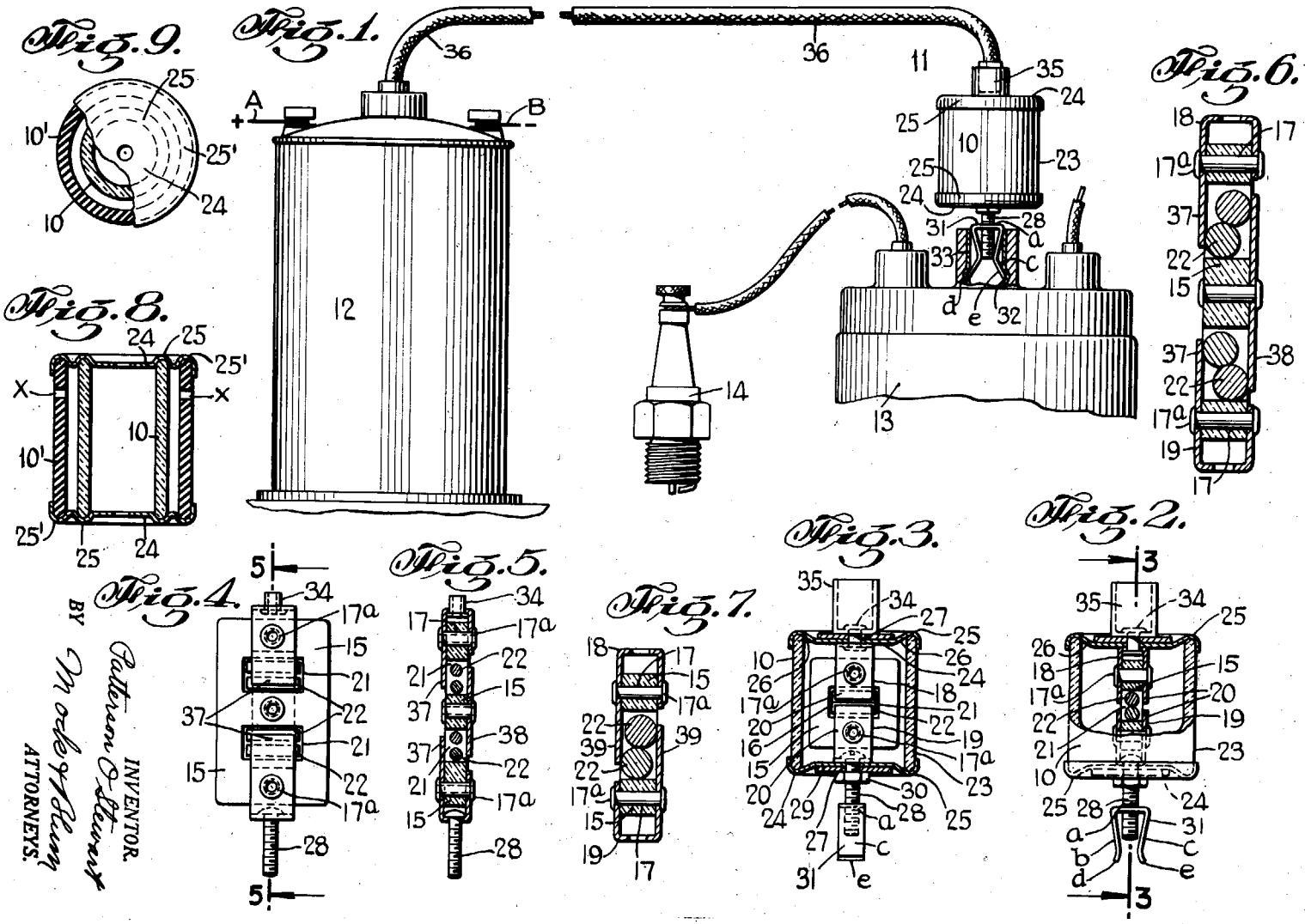
INVENTOR.
Patterson O. Stewart
BY
Mocks & Blum
ATTORNEYS.

Patented June 9, 1931 Re. 18,092

UNITED STATES PATENT OFFICE

PATTERSON O. STEWART, OF NEW YORK, N. Y.

HIGH TENSION IGNITION AMPLIFIER

Original No. 1,774,339, dated August 26, 1930, Serial No. 448,986, filed May 1, 1930. Application for reissue filed January 16, 1931. Serial No. 509,245.

My present invention relates to improvements in spark amplifying means for use in high tension ignition systems in connection with gas engines, and located in the high tension leads and preferably between the high tension coil and distributor.

An object of the invention is to provide an intensifying means to increase the efficiency of the ignition system.

Another object of the invention resides in certain features of construction and arrangement of the elements whereby constantly changing gaps are present in the ignition line.

A feature of the device consists of floating coordinating, electrodes for producing rapidly changing contacts in a gas engine ignition circuit.

Another object is to provide a means to enclose and protect the amplifier by a non-conducting absorbent casing of simple form, whereby consequent sweating may be absorbed, and to further protect the absorptive casing by an external, rigid non-conducting outer casing having breather means therein.

A further object is to provide a quickly attached electrical conductive clip whereby the device may be readily and firmly attached to the distributor or coil means without the use of tools.

My invention may take the general form of a loosely joined coupling and may comprise a cage or frame member of insulating or non-conducting material, such as fiber or the like. The cage may have one or more openings therethrough for the reception of a number of floating electrodes and being large enough to permit universal movement thereof, said electrodes confined or held captive by parallel plate extensions or portions of suitably formed clips or yokes pivoted to the end portions of the cage or frame member. From one of the clips or yokes a screw shank may project, on which an expandible spring metal clip member may be carried in threaded relation for quick firm attachment to the main socket connection of a distributor, coil, or timer head.

The screw shank also passes loosely through a centrally arranged opening of a closure plate and an insulating washer, both held in a clamped position, the plate resting against and enclosing an end of a preferably cylindrical non-conducting casing, by a clamp nut.

To complete the construction of the improved device, I secure to the opposite clip or yoke, by a rivet or other means, a closure plate similar to the one above mentioned, an insulating washer and a conductive tubular socket to receive in anchored relation, an end of the service conductor.

To provide an efficient seal at the ends of the cylindrical casing and to properly center the electrode cage therein, I form the closure plates with rolled peripheral edges to provide an annular channel which encloses the end portions of the cylindrical casing.

Various advantages inherent to my invention both in structure and function, other than those here enumerated will appear from the hereinafter detailed description.

In the drawings:—

Fig. 1 is a side elevation, partially fragmentary and sectional, of coordinating elements of a gas engine ignition circuit with my improved vibratory secondary high tension spark intensifier arranged between the ignition coil and the distributor for service.

Fig. 2 is an enlarged partially sectional side elevation of the intensifier device removed from the ignition circuit.

Fig. 3 is a vertical central section thereof, the section being on the line 3—3 of Fig. 2.

Fig. 4 is a side elevation of a modified form of cage member showing two groups or gangs of floating electrodes and a double cage construction.

Fig. 5 is a vertical central sectional elevation taken on the line 5—5 of Fig. 4.

Fig. 6 is an enlarged detail section of the double cage construction.

Fig. 7 is an enlarged section of the single cage construction showing a slightly modified form.

Fig. 8 is a sectional view of a dual walled protector casing.

Fig. 9 is a plan view thereof, partially broken away.

Referring now to the drawings in detail, 10 designates my improved vibratory secondary high tension amplifier device, installed in an ignition circuit 11, connecting the usual high tension coil 12 which is connected to a source of current A—B, a distributor 13 and spark plugs, one only being shown at 14.

The construction of the improved device may be described as follows:

In one form a non-conducting cage member 15, Figs. 2 and 3, of fiber or other insulating material is provided with a centrally arranged opening 16, and end holes 17 to receive rivets 17[a] for pivotally connecting upper and lower conductive yoke members 18 and 19 respectively having extending U-shaped side plates 20 which extend to partially overhang or overlap the sides of the central opening 16, in the cage member, the ends of which are electrically spaced away from one another, thereby providing a guarded chamber 21, adapted to receive a plurality of loose electrodes 22, preferably of roller form and made of aluminum confined in loose relation with the walls thereof. The extended electrode ends of the yokes 18 and 19 are also of aluminum and have the additional function of forming a conductive part of the ignition circuit.

To properly protect the structural elements just described and to provide a supporting media therefor, I may provide, preferably, a cylindrical shell or tubular casing 23 of insulating material, in the present instance of paper or pasteboard, which may be tightly closed at its ends by caps 24, having rolled, beaded edges 25, forming annular tube seating grooves 26, resting on and enclosing the end portions of the tubular casing; see Fig. 3; and to position the cage member and its associated parts centrally within the casing, the closure caps 24 have centrally located apertures 27.

Connected to the lower clip 19 is a headed screw 28 which passes downwardly through the lower closure cap 24 and through an insulating disk washer 29 on which a clamp nut 30 is clamped, and in free threaded engagement with said shank I provide an expandible U-shaped contact clip 31, having its free outwardly flared ends forced into engagement with an annular groove 32 provided in a molded-in tubular socket 33 in the distributor 13, by the expanding wedging action of the screw 28, as shown in Fig. 1.

In the various views, Figs. 1, 2 and 3, the expander clip 31 is shown as comprising a single strip of metal, tapped at *a* to receive therein the threaded end of the headed screw 28, said clip being bent down on opposite sides of said portion *a* with two legs *b* and *c*, these legs being inbent towards each other and then bent out again to form two opposed outstanding gripping lugs *d* and *e*. When in normal unexpanded position, Fig. 2, the lugs *d* and *e* may be freely entered into a distributor socket connection 33 and when the screw 28 is screwed downwardly therein the end of the screw 28 strikes the inbent portions of the clip, and expands them into an outwardly expanded firm electrically conductive grip with the side walls of the distributor socket 33 or its customary clip groove 32, Fig. 1.

Due to the action of the angular legs of the member 31, as described, it is obvious that it may be fitted or locked to a large variety of different dimensioned bores or sockets 32, and thus it is adapted to be adjustably locked to a wide variety of different distributors, coils or appurtenant circuit fittings from different sources of manufacture and unlike dimensional details.

The upper yoke 18 is secured to the upper closure plate 24 by a rivet 34 passing through its central opening and through an insulating disk washer and is clinched over the bottom of a tubular socket 35 designed to receive the remote end of an insulated conductor 36, in connection with the high tension coil 12 of the ignition system.

Figs. 4, 5 and 6 of the drawings illustrate, without the casing 10, a slightly modified construction embodying a double or series construction in which only one side of the yokes are extended to form a guard on one side of the electrode chambers 21, as shown at 37; the other side of the chambers 21 being closed by a centrally arranged and riveted longitudinally extending side conductive plate 38.

The construction in Fig. 7 shows a further modified single cage construction with opposite conductive side plates only of the upper and lower yokes extended partially over the cage opening as at 39 to confine the electrodes 22 therein in movable conductive relation.

In the several views the electrodes are shown in several different positions to clearly show that in their constant movements within the chamber caused by engine vibration during running of the engine, the electrodes and the confining conductive plates are in constant conductive vibrative contact.

Owing to the high tension current passing therethrough the vibrating or floating electrodes 22 are being constantly coated with an oxide, normally non-conducting if allowed to collect, but which is being constantly broken down by the vibrative rolling action of said electrodes induced by the running engine. In the manufacture of these devices the electrodes may be lacquered so as to create an artificial coating thereon which is quickly replaced by an oxide coating which is prevented from building up to an undesired thickness by the above noted vibrative, rolling action thereof.

Thus, the conductive parts, 19, 18, 22, 37 are in reality in associated contact but are slightly insulated from each other by said coating. However, the said parts are always within conductive relation with each other as confined and shown in the drawings.

Experience has shown that if the electrode means, which are formed by members 22, are not caused to move under the vibration produced by the engine, that the non-conducting oxide layer builds up so that the resistance of the device increases to a point where it is a detriment rather than an advantage. Experience has shown that if said electrode means are held either immovable, or in permanent contact with each other, that the non-conducting layer is not scaled off, so that the resistance arises to the undesirable value previously mentioned. On the contrary, tests have shown that when my device is operated, particles or flakes of said oxide layer are removed from the aluminum surfaces in a clearly visible manner. It is an additional advantage to have the circuit terminals or yokes 18 and 19 made of aluminum.

The enclosing means or casing 10, Figs. 1, 2 and 3, is, in the forms there shown, of tubular nature, and is preferably of an absorptive non-conducting nature. To this end I find that a pasteboard or paper tube of suitable thickness is satisfactory for the reason that in an enclosed device of this nature there is a certain amount of interior sweating, due to the condensation of moisture of the air within the device. When condensation occurs, the walls of the pasteboard tube readily absorb all such moisture and prevent it, by such absorption, from condensing on the conductive parts of the device in circuit.

When it becomes desirable, a double protective housing may be utilized, as in Figs. 8 and 9, in which the inner protective member 10 may be of a non-conducting absorptive material and the outer housing 10′ made of a non-conducting non-absorptive material, such as a phenolic condensation compound, and the holding caps 24 provided with a groove 24 and an added beaded groove 25′ to hold both housings 10 and 10′ in spaced operative relation. The housing 10′, has a series of breather holes $x$ therein, to permit the air within the space between 10 and 10′ to equalize to atmosphere.

What I claim is:

1. In a device for the ignition system of gas engines, an insulating casing, elongated floating electrodes mounted for relative vibrative conducting movements within said casing, and conductive elements coordinating with the electrodes for the purpose specified.

2. In a device for the ignition system of gas engines, an insulating casing, closure means for the ends thereof, a plurality of floating elongated and cylindrical electrodes within the casing, a support for said electrodes permitting relative universal movement thereof within determined limits, and conductive connections extending through said closure means.

3. In a device for the ignition systems of gas engines an insulating casing, closure plates for the ends thereof, a plurality of floating elongated and cylindrical electrodes capable of universal movement within the casing, a cage member supporting the electrodes and conductive connections pivoted to the cage member and passing outwardly through said plates.

4. In a device for the ignition systems of gas engines, an insulating casing, closure plates provided with rolled edges forming annular rim seats for the ends of said casing, an insulating cage having a central opening, elongated and cylindrical electrodes carried in said opening and of a size to permit of limited relative universal movement therein and conductive connections coordinating with the electrodes for forming a series of rapidly changing air gaps when the engine is operating.

5. In a device for the ignition system of gas engines, a cylindrical insulating casing, closure plates for the ends thereof, said plates having central openings and rolled edges enclosing the extreme end portions of said casing; elongated roller like electrodes, means for supporting the electrodes in relative universal floating relation and conductive connections coordinating with the said electrodes for forming a series of rapidly changing variable air gaps, said connections passing through the end plates of the casing.

6. In a device for the ignition system of gas engines, an insulating casing, an insulating cage member provided with a central opening therethrough, elongated electrodes universally movable in said opening, conductive plate members partially enclosing the sides of said opening and conductive means connected to the plate members and extending outwardly therefrom.

7. In a device for the ignition system of gas engines, an insulating casing, an insulating cage member arranged centrally therein and being provided with a central chamber, floating elongated and cylindrical electrodes in said chamber, conductive means for partially closing the sides of said chamber and pivoted to said cage member and outwardly projecting conductive extensions coordinating with the electrodes through said closure means for producing rapidly changing air gaps.

8. In a device of the class specified, a supporting member, elongated roller-like floating electrodes held in conductive relation thereto, and a non-conducting absorptive casing enclosing said member.

9. A casing for protecting the electrodes of a gas engine high tension ignition circuit having walls of non-conducting absorptive material, for the purpose specified, said electrodes consisting of elongated rollers operable side by side within said casing.

10. In a device for the ignition system of gas engines, in combination, a dual insulating casing, elongated cylindrical electrodes mounted to operate side by side for relative vibrative conducting movements within said casing, and conductive elements coordinating with the electrodes for the purpose specified.

11. In a device for the ignition system of gas engines, in combination, a dual casing comprising an inner member of non-conducting absorptive material and an outer member of non-conducting non-absorptive material, elongated roller electrodes mounted to operate side by side for relative vibrative conducting movements within said casing, and conductive elements coordinating with the electrodes for the purpose specified.

12. In a device of the class specified, in combination, a casing comprising spaced inner and outer members, the inner member of non-conducting absorptive material, the outer member of non-conducting non-absorptive material, closure plates for the ends of said casing, a plurality of elongated floating electrodes operable side by side for relative universal movement within the casing, a cage member supporting the electrodes and conductive elements connected to the cage member and passing outwardly through said plates.

13. In a device for the ignition system of gas engines a dual casing comprising inner and outer members, the inner member of non-conducting absorptive material, such as pasteboard and the outer member of non-conducting non-absorptive material such as a phenolic condensation compound; and a pair of elongated cylindrical roller electrodes within said casing, operable side by side, and capable of relative universal movements.

14. In a device of the class described, an insulating plate having a rectangular chamber, elongated roller electrodes loosely disposed one over another in said chamber conductive plate members pivoted to said plate at opposite sides of said chamber and extending partially over the open sides of said chamber, and conductive means attached to said conductive plate members, in combination with a casing of absorptive material for the purpose set forth.

15. In a device of the class described, an insulating plate having a chamber with open sides, a pair of elongated cylindrical electrodes normally resting side by side within said chamber and normally in contact one with the other from end to end, conductive means partially closing the sides of the chamber to permit of independent universal movements of said electrodes when engine vibration occurs, and electrical connections attached to said conductive means, in combination with a casing of absorptive material, for the purpose set forth.

16. In a device of the class specified, comprising spark amplifying means for connection into the high tension ignition system of gas-engines and a non-conducting absorptive casing surrounding said spark amplifying means as and for the purpose specified.

17. In a high tension ignition system for an internal combustion engine, a casing having circuit terminals, movable electrode means located between said terminals and adapted to complete the circuit between the adjacent surfaces of said terminals, said electrode means being made of conductive material on the outside of which a relatively non-conductive layer is formed by the passage of current, so that the potential of said ignition system must rise to a predetermined break-down voltage before said current can pass, said electrode means being sufficiently freely movable by the vibration of the engine to cause an undesirable excess of said layer to be removed, the adjacent surfaces of said terminals being sufficiently close to each other so that said electrode means is held substantially in associated contact with said surfaces while being insulated from said surfaces by said coating.

18. In a high tension ignition system for an internal combustion engine, a casing having circuit terminals, movable electrode means located between said terminals and adapted to complete the circuit between the adjacent surfaces of said terminals, said electrode means being made of conductive material on the outside of which a relatively non-conductive layer is formed by the passage of current, so that the potential of said ignition system must rise to a predetermined break-down voltage before said current can pass, said electrode means being sufficiently freely movable by the vibration of the engine to cause an undesirable excess of said layer to be removed, the adjacent surfaces of said terminals being sufficiently close to each other so that said electrode means is held substantially in associated contact with said surfaces while being insulated from said surfaces by said coating, said electrode means comprising a plurality of electrode members which are movable with respect to each other and with respect to said circuit terminals.

19. In a high tension ignition system for an internal combustion engine, a casing having circuit terminals, movable electrode means located between said terminals and adapted to complete the circuit between the adjacent surfaces of said terminals, said electrode means being made of conductive material on the outside of which a relatively non-conductive layer is formed by the passage of current, so that the potential of said ignition system must rise to a predetermined break-down voltage before said current can pass, said electrode means being sufficiently freely movable by the vibration of the engine to cause an undesirable excess of said layer to be removed, the adjacent surfaces of said terminals being sufficiently close to each other so that said electrode means is held substantially in associated contact with said surfaces while being insulated from said surfaces by said coating, said circuit terminals being also made of material on which a relatively non-conducting layer is formed by the passage of the current.

20. In a high tension ignition system for an internal combustion engine, a casing having circuit terminals, movable electrode means located between said terminals and adapted to complete the circuit between the adjacent surfaces of said terminals, said electrode means being made of conductive material on the outside of which a relatively-non-conductive layer is formed by the passage of current, so that the potential of said ignition system must rise to a predetermined break-down voltage before said current can pass, said electrode means being sufficiently freely movable by the vibration of the engine to cause an undesirable excess of said layer to be removed, the adjacent surfaces of said terminals being sufficiently close to each other so that said electrode means is held substantially in associated contact with said surfaces while being insulated from said surfaces by said coating, said electrode means comprising a plurality of electrode members which are movable with respect to each other and with respect to said circuit terminals, said electrode members being separated and being at least partially turnable so that the vibration of the engine causes said electrode members to rub against each other and against the adjacent surfaces of the circuit terminals.

In testimony whereof, I affix my signature.

PATTERSON O. STEWART.